United States Patent [19]
Hamanaka et al.

[11] Patent Number: 5,990,992
[45] Date of Patent: Nov. 23, 1999

[54] IMAGE DISPLAY DEVICE WITH PLURAL PLANAR MICROLENS ARRAYS

[75] Inventors: Kenjiro Hamanaka; Takashi Kishimoto, both of Osaka, Japan

[73] Assignee: Nippon Sheet Glass Co., Ltd., Osaka, Japan

[21] Appl. No.: 09/110,797

[22] Filed: Jul. 6, 1998

Related U.S. Application Data

[63] Continuation-in-part of application No. 08/820,313, Mar. 18, 1997, abandoned.

[51] Int. Cl.$^6$ ........................ G02F 1/1335; G02F 1/1333; G02B 17/00
[52] U.S. Cl. ............................ 349/95; 349/158; 359/365
[58] Field of Search ..................... 349/95, 158; 359/365, 359/366

[56] References Cited

U.S. PATENT DOCUMENTS

| | | | |
|---|---|---|---|
| 5,052,783 | 10/1991 | Hamada | 359/40 |
| 5,056,912 | 10/1991 | Hamada et al. | 353/38 |
| 5,126,863 | 6/1992 | Otsuka et al. | 359/41 |
| 5,398,125 | 3/1995 | Willett et al. | 359/41 |
| 5,479,049 | 12/1995 | Aoki et al. | 257/642 |
| 5,499,138 | 3/1996 | Iba | 359/569 |
| 5,504,602 | 4/1996 | Farmer | 359/69 |
| 5,619,228 | 4/1997 | Dohtery | 345/148 |
| 5,627,580 | 5/1997 | Nelson | 347/239 |
| 5,633,737 | 5/1997 | Tanaka et al. | 349/95 |
| 5,654,741 | 8/1997 | Sampsell | 345/158 |
| 5,680,186 | 10/1997 | Watanabe et al. | 349/95 |
| 5,682,215 | 10/1997 | Nishihara et al. | 349/95 |
| 5,706,061 | 1/1998 | Marshall et al. | 348/743 |
| 5,764,318 | 6/1998 | Kurematsu et al. | 349/95 |
| 5,764,323 | 6/1998 | Fukuda | 349/95 |
| 5,849,339 | 12/1998 | Nakanishi | 425/4 R |
| 5,867,321 | 2/1999 | Nakama et al. | 359/619 |

FOREIGN PATENT DOCUMENTS

| | | |
|---|---|---|
| 4-60538 | 2/1992 | Japan . |
| 5-341283 | 12/1993 | Japan . |
| 5-346578 | 12/1993 | Japan . |
| 6-67168 | 3/1994 | Japan . |
| 6-118370 | 4/1994 | Japan . |
| 7-181487 | 7/1995 | Japan . |
| 8-15687 | 1/1996 | Japan . |

*Primary Examiner*—William L. Sikes
*Assistant Examiner*—Tarifur R. Chowdhury
*Attorney, Agent, or Firm*—Merchant & Gould P.C.

[57] ABSTRACT

A reflective or transmissive image display device having a light-transmissive panel to which illuminating light for illuminating pixels is applied. The light-transmissive panel has laminated glass substrates having respective first and second planar microlens arrays. The glass substrates have their thicknesses adjusted by grinding to equalize focal lengths and other parameters of the first and second planar microlens arrays to preset values. Lenses of the first and second planar microlens arrays are formed by etching recesses in fire-finished surfaces of the glass substrates and filling the recesses with a synthetic resin having a high refractive index.

2 Claims, 11 Drawing Sheets

IMAGE DISPLAY DEVICE WITH PLURAL PLANAR MICROLENS ARRAYS

This is a Continuation-In-Part of U.S. Ser. No. 08/820,313, filed Mar. 18, 1997 now abandoned.

BACKGROUND OF THE INVENTION

1. Field of the Invention

The present invention relates to a reflective or transmissive image display device for use in a liquid-crystal projector or a projection television set (PTV) for displaying television or computer images at an enlarged scale.

2. Description of the Prior Art

More and more projectors which employ liquid crystal display devices capable of increasing image brightness depending on the brightness of illuminating light sources are finding use in place of projectors which employ cathode-ray tubes (CRTs).

Liquid crystal display devices are roughly classified into reflective and transmissive liquid crystal display devices. In the transmissive liquid crystal display device, illuminating light is applied to a liquid crystal layer on which an image is formed, and the illuminating light which has passed through the liquid crystal layer is projected onto a projection screen by an optical system. In the reflective liquid crystal display device, illuminating light is applied to a liquid crystal layer on which an image is formed, and the illuminating light which has been reflected by the liquid crystal layer is projected onto a projection screen by an optical system.

A color projector using such reflective liquid crystal display devices will be described below with reference to FIG. 11 of the accompanying drawings. As shown in FIG. 11, illuminating white light emitted from a white light source 100 is applied through a beam splitter 101 to a dichroic prism 102, which divides the white light into red light, blue light, and green light that are applied to corresponding reflective liquid crystal display devices 103. Images displayed by respective CRTs 104 are formed on the respective reflective liquid crystal display devices 103, and read as reflections of the applied red light, blue light, and green light. The read light passes through the beam splitter 101, and is projected as a combined image of the three colors onto a projection screen 105.

As shown in FIG. 12 of the accompanying drawings, each of the reflective liquid crystal display devices 103 comprises a pair of glass substrates 111, 118 with transparent electrodes 112, 117 disposed respectively on their confronting surfaces. A photoconductor layer 113 of Si, CdS, or the like, a light shield layer 114, and a mirror layer 115 are successively deposited on the transparent layer 112. A liquid crystal layer 116 is sealed between the transparent layer 117 and the mirror layer 115, thereby assembling a liquid crystal display cell as shown in FIG. 12. A voltage is applied between the transparent electrodes 112, 117.

The image displayed by the CRT 104 is focused onto the photoconductor layer 113 through a focusing lens.

Since the resistance of the photoconductor layer 113 varies depending on the intensity of the light of the displayed image, an electric field applied to the liquid crystal layer 116 also varies depending on the intensity of the light of the displayed image. When illuminating light is applied from the glass substrate 1 18 to the liquid crystal layer 116, an image written in the liquid crystal layer 116 by the focused CRT image is read as reflections of the applied illuminating light.

The color projector shown in FIGS. 11 and 12 requires the three sets of liquid crystal display devices 103 and CRTs 104 corresponding to the three primaries, and is necessarily large in size.

If a color projector has only one liquid crystal display device 103, then the color projector may be reduced in size. One conventional color projector with a single liquid crystal display device uses a mosaic three-primary color filter. However, this conventional color projector utilizes only one-third of the illuminating light. Japanese laid-open patent publication No. 4-60538 discloses a color projector which solves such a problem.

According to Japanese laid-open patent publication No. 4-60538, it is proposed to reduce the size of the color projector without reducing the brightness of illuminating light, using only one liquid crystal display device. In the disclosed color projector, as shown in FIGS. 13 and 14 of the accompanying drawings, illuminating light emitted from a white light source 150 is divided by dichroic mirrors 151 into light rays of three primaries, red (R), blue (B), and green (G), which are applied to a liquid crystal display device 152 at different angles thereto. Light emitted from the liquid crystal display device 152 is projected through a field lens 153 and a projection lens 154 onto a projection screen 155. As shown in FIG. 14, the liquid crystal display device 152 comprises a pair of glass substrates 171, 172 with scanning and signal electrodes 171a, 172a mounted on respective confronting surfaces thereof. A liquid crystal layer 174 is filled in a gap which is defined between the glass substrates 171, 172 by a spacer 173. A planar microlens array 175 is joined to a surface of the glass substrate 171 to which the three-primary light rays are applied. The planar microlens array 175 serves to converge the three-primary light rays onto the signal electrodes 172a (pixel openings).

If the liquid crystal display device shown in FIG. 14 is directly used as a reflective liquid crystal display device, then reflected light does not pass through the centers of the lenses of the planar microlens array 175, as shown in FIG. 15 of the accompanying drawings, so that the illuminating light cannot effectively be utilized.

The lenses and pixels may be arrayed as shown in FIG. 17 of the accompanying drawings for effective utilization of the illuminating light. With the lenses and pixels thus arrayed, the reflected light passes through the centers of the lenses of the planar microlens array 175 as shown in FIG. 18 of the accompanying drawings.

However, as can be seen from FIG. 17, in order for the reflected light to pass through the centers of the lenses, pixel electrodes cannot be arrayed linearly, but must be arrayed in an irregular pattern, which imposes undue limitations on the design of other components, resulting in disadvantages in total design.

The planar microlens array 175 which is employed in the transmissive liquid crystal display device shown in FIGS. 13 and 14 allows almost all illuminating light to pass there-through. Therefore, it can increase the brightness of images projected onto the projection screen 155. However, because the illuminating light which leaves the liquid crystal display device 152 spreads through a large angle, it is necessary that the projection lens 154 have a large diameter, as shown in FIG. 16 of the accompanying drawings. As a consequence, the entire optical system of the color projector is large in size.

Proposals for reducing the diameter of the projection lens used in combination with the planar microlens array are disclosed in Japanese laid-open patent publications Nos. 5-341283 and 7-181487. According to the disclosure of Japanese laid-open patent publication No. 5-341283, as shown in FIG. 19 of the accompanying drawings, a microlens array has two lens arrays 175a, 175b on opposite surfaces of a single glass substrate. The lens array 175a serves to converge illuminating light onto pixel openings, whereas the lens array 175b serves to make principal rays of exiting light parallel to the optical axis thereof. Japanese laid-open patent publication No. 7-181487 reveals two microlens arrays joined respectively to opposite surfaces of a single glass substrate.

If the double-sided microlens array shown in FIG. 19 is incorporated in the optical system shown in FIGS. 13 and 14, then it is necessary that the thickness of the glass substrate 171 be set to such a value as to cause principal arrays of the colors R, B, which are inclined at certain respective angles to the optical axis, to be applied to pixel electrodes 172a corresponding to the colors R, B on the liquid crystal panel. In many cases, pixel pitches are given by liquid crystal panels that are used, and angles at which the light rays of R, G, B are inclined are given by the aperture of the projection lens and the layout of the illuminating optical system, after which the thickness of the glass substrate 171 is determined based on the pixel pitch and the angles. Stated otherwise, the glass substrate 171 may have any of various thicknesses depending on the liquid crystal panel and the illuminating optical system which are used.

The double-sided microlens array shown in FIG. 19 may be fabricated by a process shown in FIG. 20 of the accompanying drawings. According to the illustrated process, a mask 163 is placed over one side of a glass substrate 175 (such as of #7059 or #1737 manufactured by Corning Incorporated or NA45 or NA35 manufactured by NH Technoglass Co. Ltd.), and the glass substrate 175 is etched by isotropic etching to form substantially hemispherical recesses 164 therein. Then, the recesses 164 are filled with a synthetic resin having a high refractive index, producing a microlens array 175a as shown in FIG. 21 of the accompanying drawings. Thereafter, the glass substrate 175 is ground to a desired thickness by a grinding wheel on its surface opposite to the microlens array 175a. The ground surface is then etched by isotropic etching to form substantially hemispherical recesses therein, which are then filled with a synthetic resin having a high refractive index, producing a microlens array 175b (see FIG. 19).

If the ground surface of the glass substrate 175 is not sufficiently smooth but contains a minute flaw, then an etched recess 164 tends to be distorted in shape, as shown in FIG. 22 of the accompanying drawings. The double-sided microlens array with such a distortion has a poor light converging capability. Though the finished glass substrate needs to have any of various thicknesses, as described above, commercially available glass substrates in reality have only certain thicknesses such as of 1.1 mm and 0.7 mm. To process such a commercially available glass substrate into a desired thickness, it is often necessary to grind the glass substrate to a considerable extent, possibly with the need to adjust its thickness according to a rough grinding process, known as lapping, using a loose abrasive material and a hard pad. After the glass substrate has been lapped, it is polished to such an accurate surface finish that any recesses etched in the polished surface will not be distorted. This grinding process is, however, so complex that the manufacturing cost of the double-sided microlens array is high.

The same problem also arises if both surfaces of the glass substrate are initially ground and polished to a desired thickness. As a result the double-sided microlens array shown in FIG. 19 is actually very expensive to manufacture.

The structure disclosed in Japanese laid-open patent publication No. 7-181487, i.e., the microlens array assembly which has two microlens arrays joined respectively to opposite surfaces of a single glass substrate, is also disadvantageous in that its overall thickness is unduly large.

SUMMARY OF THE INVENTION

It is therefore an object of the present invention to provide an image display device of the reflective or transmissive type which includes a planar microlens array to achieve a desired degree of brightness and reduce the aperture of a projection lens for use therewith.

According to an aspect of the present invention, there is provided a reflective image display device for controlling a reflectivity with respect to illuminating light applied to pixels depending on an image to be displayed, comprising reflecting means for reflecting illuminating light toward a readout side thereof, and a light-transmissive panel positioned on the readout side of the reflecting means, the light-transmissive panel comprising a first planar microlens array having lenses for converging the illuminating light and a second planar microlens array having lenses for refracting the illuminating light, which has passed through the first planar microlens array, so as to be applied substantially perpendicularly to the reflecting means.

The light-transmissive panel may comprise a first substrate with the first planar microlens array disposed thereon and a second substrate with the second planar microlens array disposed thereon, the first substrate and the second substrate being laminated to each other. Alternatively, the light-transmissive panel may comprise a substrate with the first and second planar microlens arrays disposed on respective opposite surfaces thereof.

The reflective image display device may further comprise a pair of panels, at least one of which is the light-transmissive panel, and a liquid crystal layer disposed between the panels, the reflecting means comprising a reflecting surface disposed on a surface of the liquid crystal layer remotely from the light-transmissive panel, for reflecting the illuminating light applied to the liquid crystal layer thereby to read an image displayed by the liquid crystal layer as reflected light.

The reflecting means may comprise a micromirror array (a digital mirror device) having minute mirrors corresponding respectively to the pixels, the light-transmissive panel being disposed on the readout side of the micromirror array, and means for controlling angles of the minute mirrors respectively with respect to the pixels, for thereby controlling a pattern of reflections of the illuminating light applied to the micromirror array to display the pattern of reflections as an image.

According to the present invention, there is also provided a transmissive image display device comprising a pair of light-transmissive panels, a liquid crystal layer disposed between the light-transmissive panels, and a plurality of pixel electrodes disposed adjacent to the liquid crystal layer and defining pixel openings, respectively, one of the light-transmissive panels being disposed on a readout side of the liquid crystal layer and comprising a first microlens array and a second microlens array which are laminated to each other, the first microlens array being positioned remotely from the liquid crystal layer and having lenses on a first surface thereof for receiving rays of illuminating light applied thereto in respective different wavelength ranges and converging the rays of illuminating light onto the pixel electrodes, the second microlens array being positioned closer to the liquid crystal layer and having lenses on a first surface thereof for refracting principal rays of illuminating light substantially parallel to optical axes thereof for passage through the pixel openings, each of the first and second planar microlens arrays having a second surface opposite to the first surface thereof which is ground to adjust a thickness thereof, the first surface of the first planar microlens array being joined to the second surface of the second planar microlens array.

The rays of illuminating light applied in the respective different wavelength ranges may comprise rays of illuminating light in primary colors, the pixel electrodes being linearly arrayed in a repetitive pattern and divided into groups each comprising pixel electrodes corresponding respectively to the three primaries, the pixel electrodes in each of the groups having respective centers disposed in a region of one of the lenses.

Each of the first microlens array and the second microlens array comprises a glass substrate having a fire-finished surface etched to define recesses therein, the recesses being filled with a synthetic resin having a high refractive index thereby to form the lenses.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
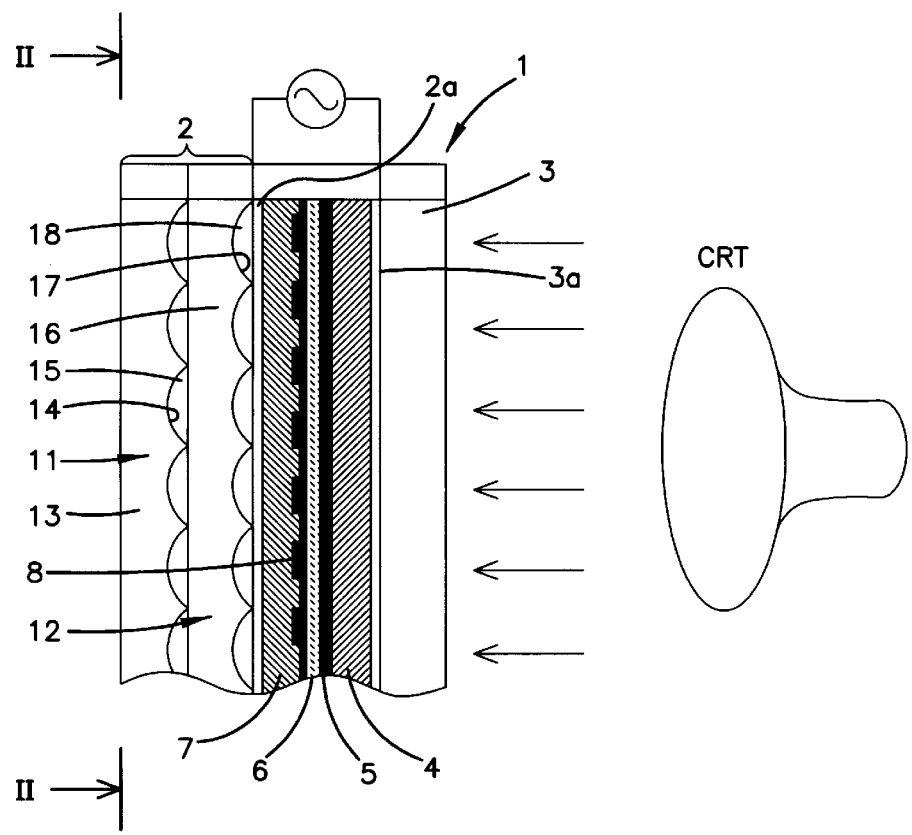
FIG. 1 is a cross-sectional view of a reflective image display device according to a first em dient of the present invention.
Figure 2:
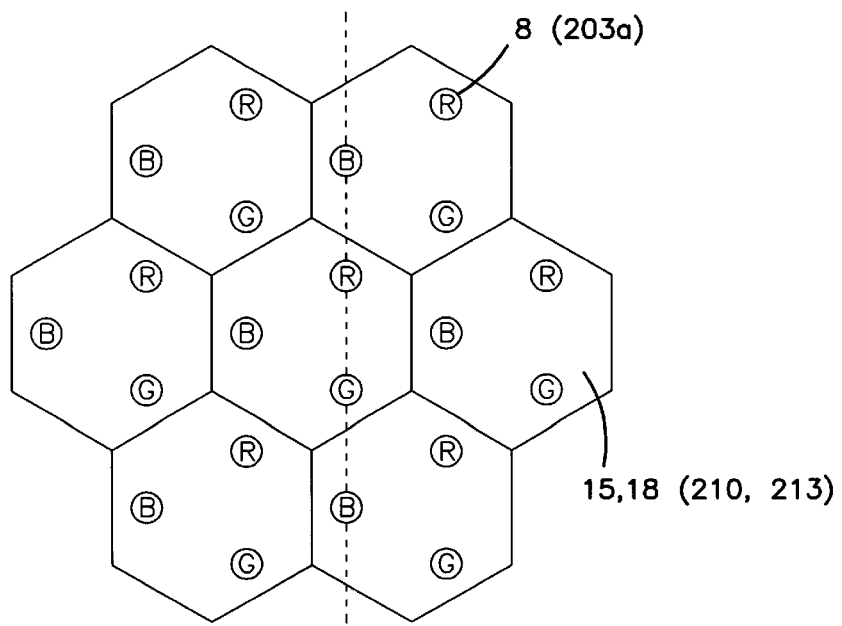
FIG. 2 is a front elevational view taken along line II—II of FIG. 1, showing a pattern of pixels with respect to lenses.

FIGS. 1 and 2 show a reflective liquid crystal display device as an image display device according to a first embodiment of the present invention.

As shown in FIGS. 1 and 2, the reflective liquid crystal display device, generally designated by the reference numeral 1, comprises a pair of two light-transmissive panels 2, 3, a pair of transparent electrodes 2a, 3a disposed on respective confronting surfaces of the light-transmissive panels 2, 3, a photoconductor layer 4 disposed on the transparent electrode 3a, a light shield layer 5 disposed on the photoconductor layer 4, a reflective film 6 disposed on the light shield layer 5, and a liquid crystal layer 7 filled in a gap between the reflective film 6 and the light-transmissive panel 2. Pixel electrodes 8 are disposed on the surface of the reflective film 6 which is held in contact with the liquid crystal layer 7.

According to the first embodiment, the light-transmissive panel 2 comprises first and second planar microlens arrays 11, 12 that are laminated to each other. The first planar microlens array 11, which is positioned remotely from the liquid crystal layer 7, has lenses 15 that are formed by filling a synthetic resin having a high refractive index (1.58 to 1.63) in respective recesses 14 defined in one surface of a glass substrate 13 which is held against the second planar microlens array 12. The lenses 15 serve to converge light that is applied to the first planar microlens array 11. The second planar microlens array 12, which is positioned closer to the liquid crystal layer 7, has lenses 18 that are formed by filling a synthetic resin having a high refractive index (1.58 to 1.63) in respective recesses 17 defined in one surface of a glass substrate 16 which is held against the transparent electrode 2a. The lenses 18 serve to refract the light that has passed through the lenses 15 of the first planar microlens array 11 so as to be applied perpendicularly to the reflective film 6.

The lenses 15, 18 are aligned with each other such that they have common optical axes. As shown in FIG. 2, three pixel electrodes 8, which serve as a triad, have respective centers positioned respectively at the equally spaced vertexes of a triangle within the region of each of the lenses 15, 18, which have a hexagonal profile. According to the pixel electrode pattern shown in FIG. 2, the centers of pixels of red (R), blue (B), green (G) are linearly arrayed across a plurality of lens regions.

Figure 3:
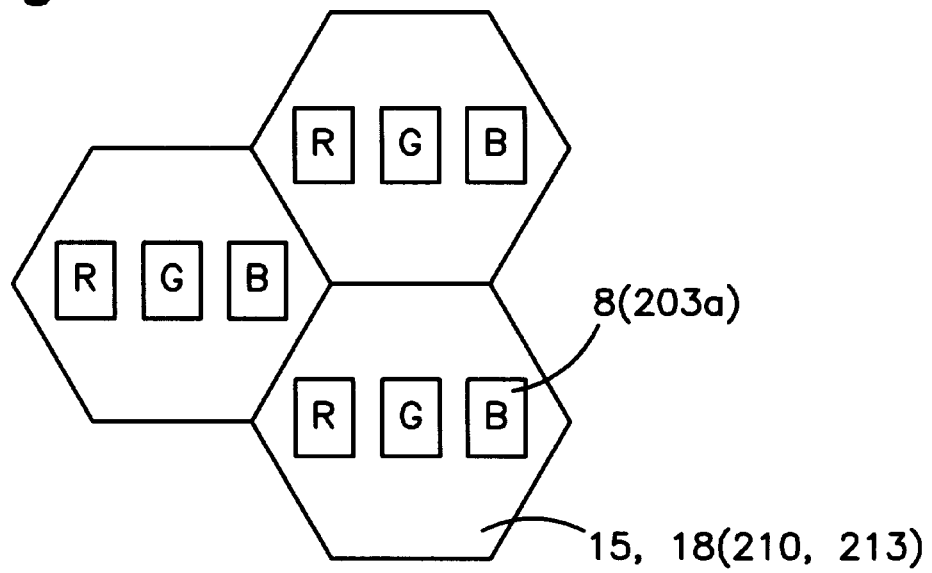
FIG. 3 is a front elevational view of a pattern of pixels with respect to lenses according to a first alternative which is different from the pattern of pixels shown in FIG. 2.
Figure 4:
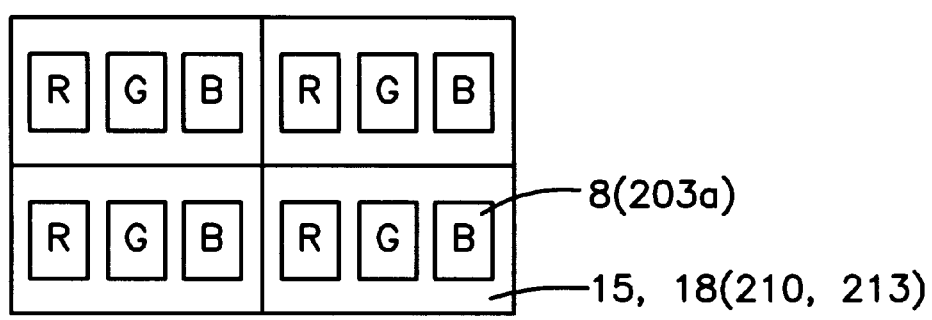
FIG. 4 is a front elevational view of a pattern of pixels with respect to lenses according to a second alternative which is different from the patterns of pixels shown in FIGS. 2 and 3.

According to a first alternative shown in FIG. 3, pixels of red (R), blue (B), green (G) are linearly arrayed within the hexagonal region of each of the lenses 15, 18. FIG. 4 shows a second alternative in which each of the lenses 15, 18 has a rectangular profile and pixels of red (R), blue (B), green (G) are linearly arrayed within the rectangular region of each of the lenses 15, 18. Further alternatively, each of the lenses 15, 18 may have a circular profile, an elliptical profile, an oval profile, or the like.

The glass substrates 13, 16 have their thicknesses adjusted by grinding to equalize focal lengths and other parameters of the planar microlens arrays 11, 12 to preset values.

The lenses 15, 18 of the planar microlens arrays 11, 12 are fabricated as follows: Smooth surfaces of the glass substrates 13, 16 which have not been ground are etched to form the recesses 14, 17. Then, a synthetic resin having a high refractive index are filled in the recesses 14, 17, forming the lenses 15, 18. Since the smooth surfaces of the glass substrates 13, 16 are etched, the etchant does not flow along minute flaws which would otherwise be produced by a grinding process. As a consequence, the recesses 14, 17 that are formed by the etching process have a shape that is not distorted when viewed in plan. The other surfaces of the glass substrates 13, 16 which have been ground contain minute flaws. Such minute flaws are filled up with an adhesive which comprises a synthetic resin having high refractive index, and hence will not pose any significant optical problems.

An image displayed on a CRT that is positioned adjacent to the reflective liquid crystal display device 1 is applied to the reflective liquid crystal display device 1, and converted by the photoconductor layer 4 into electric charges that form the same image as the image displayed on the CRT on the liquid crystal layer 7.

Figure 5:
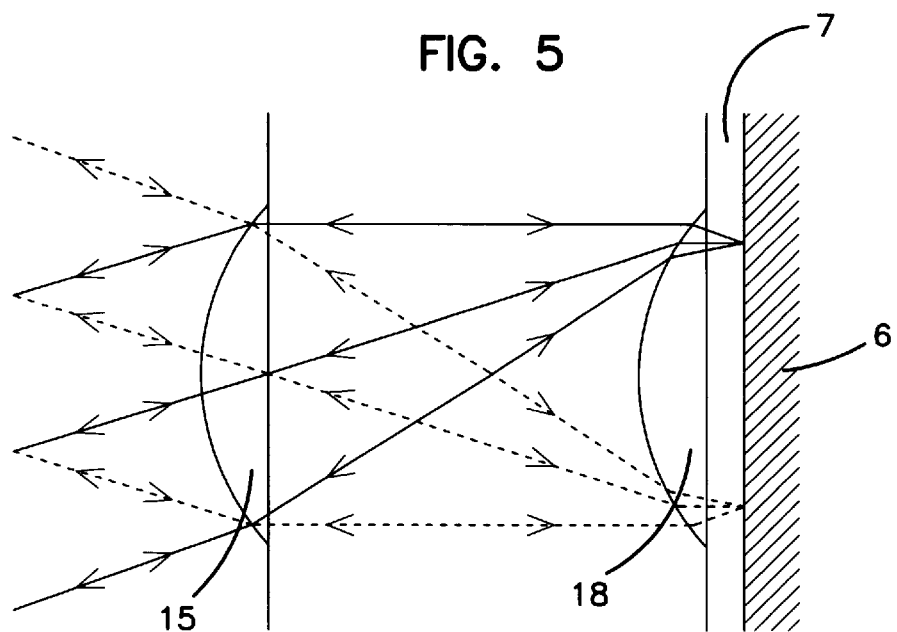
FIG. 5 is a schematic view showing paths of illuminating light applied to and reflected light reflected from the reflective image display device shown in FIG. 1.

Rays of illuminating light that have been divided into three primaries are applied to each of the lenses 15 at respective different angles, as shown in FIG. 5. The rays of illuminating light are converged by the lens 15, and then refracted by the lens 18 so as to be applied perpendicularly to the reflective film 6. Readout light which is reflected by the reflective film 6 as a result of the application of the rays of illuminating light to the reflective film 6 travels back along the same path as the path of the rays of illuminating light, and exits from the reflective liquid crystal display device 1.

Therefore, when the illuminating light is applied through the center of the lens 15, the reflected light which is produced by the illuminating light exits through the center of the lens 15. The illuminating light is thus effectively utilized.

Figure 6:
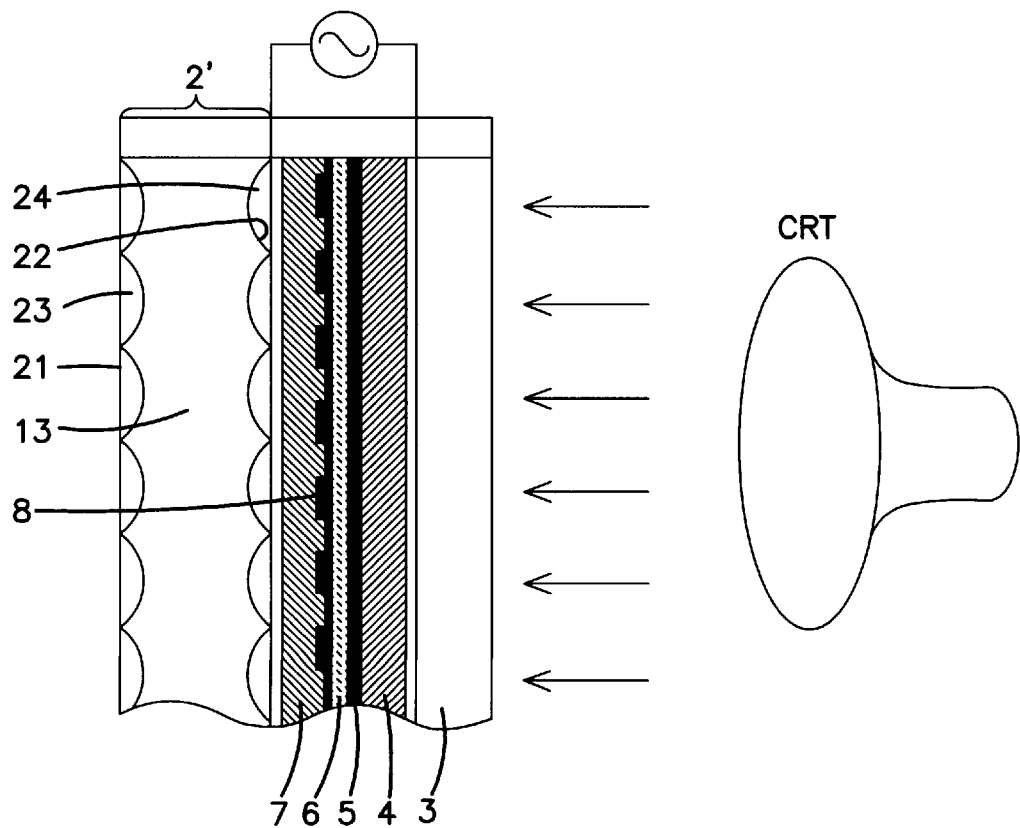
FIG. 6 is a cross-sectional view of a reflective image display device according to a first modification which includes a modified transmissive panel in place of a light-transmissive panel of the reflective image display device shown in FIG. 1.

FIG. 6 shows a reflective liquid crystal display device according to a first modification which includes a modified microlens array in place of the microlens array of the reflective image display device shown in FIG. 1. According to the first modification, a light-transmissive panel 2' comprises a single planar microlens array. The planar microlens array comprises a glass substrate 20 having recesses 21, 22 defined in opposite surfaces thereof and filled with a synthetic resin having a high refractive index (1.58 to 1.63), forming lenses 23, 24. The reflective liquid crystal display device shown in FIG. 6 operates in the same manner as the reflective liquid crystal display device shown in FIG. 1.

Figure 7:
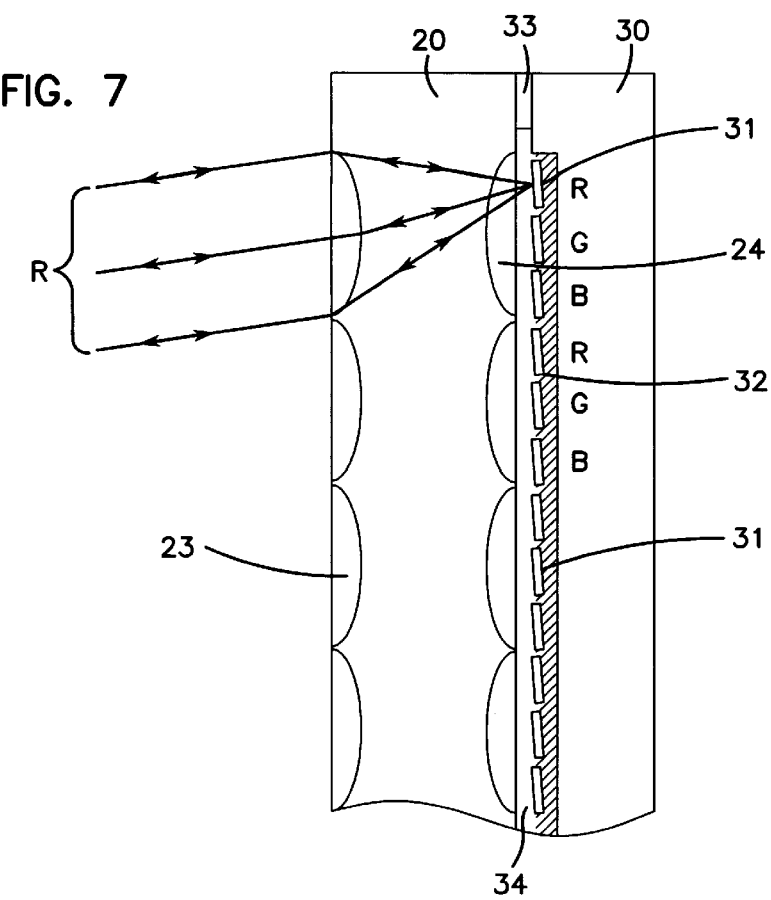
FIG. 7 is a cross-sectional view of a reflective image display device according to a second modification which includes a micromirror array, in place of a liquid crystal layer, a reflecting layer, etc. of the reflective image display device shown in FIG. 1.

FIG. 7 shows a reflective image display device according to a second modification which includes a micromirror array (digital mirror device) in place of the liquid crystal layer of the reflective image display device according to the first modification.

According to the second modification, an Si substrate 30 is etched to leave a portion thereof as a micromirror 31. Specifically, a rear surface of the Si substrate 30 which faces the glass substrate 20 (see also FIG. 6) is etched by isotropic etching to form the micromirror 31 which is partially joined to the Si substrate 30. A micromirror actuating system 32 is disposed on the etched rear surface of the Si substrate 30 for tilting the micromirror 31.

The glass substrate 20 is mounted on the etched rear surface of the Si substrate 30 by a spacer 33 which is interposed between the glass substrate 20 and the Si substrate 30. The glass substrate 20 has lenses 23, 24 on their opposite surfaces which are made of a synthetic resin having a high refractive index. A space 34 for the micromirror 31 to be able to be tilted therein is defined between the glass substrate 20 and the Si substrate 30.

When the micromirror 31 is not tilted, reflected light is returned, substantially 100%, from the reflective image display device to a projection screen. When the micromirror 31 is tilted, since reflected light is also tilted with respect to the reflective image display device, it is vignetted by a projection lens after having passed through the lenses 23, 24, so that the intensity of light on the projection screen is reduced.

An electric drive (video) signal is applied to the micromirror actuating system 32, which tilts the micromirror 31 to a degree depending on the electric drive signal. In this manner, an image represented by the electric drive signal can be displayed on the projection screen by the reflective image display device.

The lenses of the planar microlens array or arrays described above may be fabricated as lenses whose refractive index gradually varies, by an ion exchange process, rather than the above process of filling a synthetic resin having a high refractive index in recesses defined in a glass substrate by etching.

The reflective image display device shown in FIG. 6 is used in a single-panel projector. However, the reflective image display device according to the first embodiment may be applicable to any of various projectors.

With the first embodiment, as described above, the light-transmissive panel on the readout side of the two light-transmissive panels which hold the liquid crystal layer therebetween has the first and second planar microlens arrays that are laminated to each other, and the first planar microlens array has lenses for converging illuminating light and the second planar microlens array has lenses for refracting the illuminating light, which has passed through the first planar microlens array, so as to be applied perpendicularly to the reflective film. Therefore, it is possible to converge the illuminating light onto the pixel electrodes, and to read the reflected light that has passed through the same path as the illuminating light.

The lenses of the planar microlens arrays are fabricated by etching the recesses in the smooth surfaces of the glass substrates which are not ground and filling a synthetic resin having a high refractive index in the recesses. Since the smooth surfaces of the glass substrates can uniformly be etched, the microlens arrays have excellent optical properties.

With the first and second modifications, the light-transmissive panel on the readout side of the two light-transmissive panels which hold the liquid crystal layer or the micromirror array therebetween has the planar microlens array, and the planar microlens array has lenses on opposite surfaces of the glass substrate. The lenses positioned remotely from the liquid crystal layer or the micromirror array serves to converge illuminating light and the lenses positioned closer to the liquid crystal layer or the micromirror array serves to refract the illuminating light so as to be applied perpendicularly to the reflective film. The first and second modifications thus offer the same advantages as the first embodiment.

Since the lenses of the planar microlens array are formed on the opposite surfaces of the single glass substrate in the first or second modification, the total number of parts used is reduced.

An image display device (transmissive liquid crystal display device) according to a second embodiment of the present invention will be described below.

Figure 8:
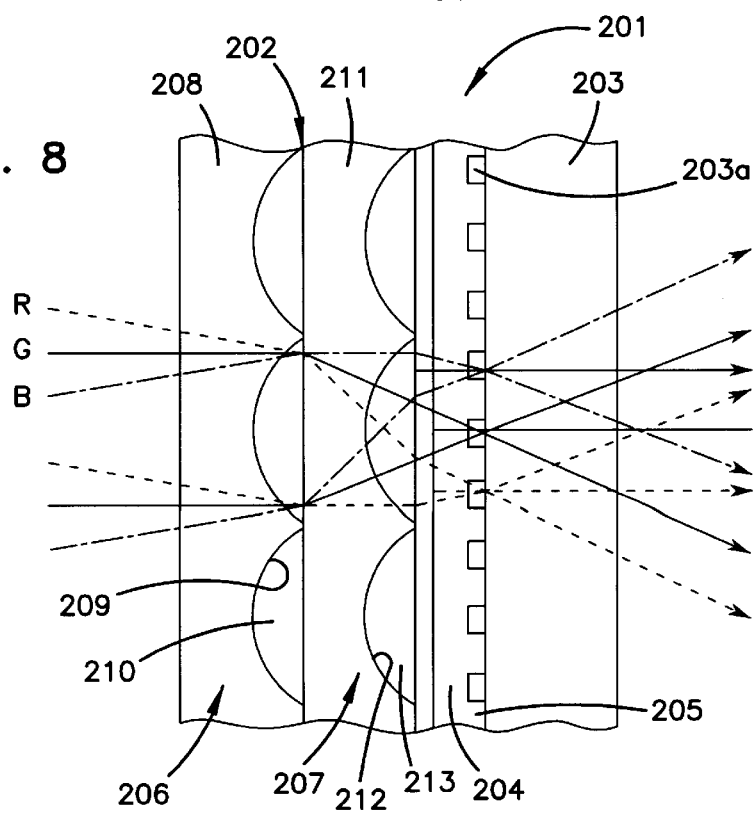
FIG. 8 is a cross-sectional view of a transmissive image display device according to a second embodiment of the present invention.

FIG. 8 shows in cross section the transmissive liquid crystal display device according to the second embodiment of the present invention. As shown in FIG. 8, the transmissive liquid crystal display device, generally designated by the reference numeral 201, has a liquid crystal layer 205 filled in a gap 204 defined between light-transmissive panels 202, 203. Specifically, the light-transmissive panel 202 which is positioned for the application of illuminating light thereto comprises first and second planar microlens arrays 206, 207 that are laminated to each other. A black matrix layer of Cr or the like and a transparent conductive film of ITO or the like are formed on the surface of the second planar microlens array 207 which confronts the light-transmissive panel 203, and an alignment film is formed thereon. TFT5 (thin-film transistors) and pixel electrodes 203a are formed on the surface of the light-transmissive panel 203 which faces the light-transmissive panel 202. These light-transmissive panels 202, 203 are combined into a cell, and the liquid crystal layer 205 is introduced into the gap 204, thereby completing the transmissive liquid crystal display device 201.

The first planar microlens array 206 positioned remotely from the liquid crystal layer 205 comprises a glass substrate 208 having recesses 209 etched in a surface thereof, which faces the second planar microlens array 206, and filled with a synthetic resin having a high refractive index, forming lenses 210. The second planar microlens array 206 positioned closer to the liquid crystal layer 205 also comprises a glass substrate 207 having recesses 212 etched in a surface thereof, which faces the liquid crystal layer 205, and filled with a synthetic resin having a high refractive index, forming lenses 213.

The synthetic resin having a high refractive index should be selected to clear the weather resistance of a general home electric appliance level and also to withstand temperatures, ranging from about 150 to 200° C., of a liquid crystal display device fabrication process, e.g., steps of forming the transparent conductive film, forming the alignment film, and combining the light-transmissive panels into a cell.

As with the first embodiment, the lenses 210, 213 of the first and second planar microlens arrays 206, 207 are aligned with each other, and three pixel electrodes 203a, which serve as a triad, have respective centers positioned respectively at the equally spaced vertexes of a triangle within the region of each of the lenses 210, 213, as shown in FIG. 2. According to the pixel electrode pattern shown in FIG. 2, the centers of pixels of red (R), blue (B), green (G) are linearly arrayed across a plurality of hexagonal lens regions., Furthermore, as with the first embodiment, pixels of red (R), blue (B), green (G) may be linearly arrayed within the hexagonal region of each of the lenses 210, 213. Alternatively, each of the lenses 210, 213 may have a rectangular profile and pixels of red (R), blue (B), green (G) may be linearly arrayed within the rectangular region of each of the lenses 210, 213, as shown in FIG. 4. Further alternatively, each of the lenses 210, 213 may have a circular profile, an elliptical profile, an oval profile, or the like.

The glass substrates 208, 211 have their thicknesses adjusted by grinding to equalize focal lengths and other parameters of the planar microlens arrays 206, 207 to preset values.

The lenses 210, 213 of the planar microlens arrays 206, 207 are fabricated as follows: Fire-finished (smooth) surfaces of the glass substrates 208, 211 which have not been ground are etched to form the recesses 209, 212. Then, a synthetic resin having a high refractive index is filled in the recesses 209, 212, forming the lenses 210, 213.

If outer peripheral grooves are defined by etching in the glass substrates 208, 211 at the same time that the recesses 209, 212 are formed, then an excessive amount of the synthetic resin supplied to the recesses 209, 212 will be collected by those outer peripheral grooves, leaving almost no excessive resin layer on the lenses 210, 213. Therefore, the surfaces of the lenses 210, 213 are made much flatter than the conventional double-layer planar microlens array structure. The formation of these outer peripheral grooves is highly effective in fabricating liquid crystal display devices of high quality.

Figure 9:
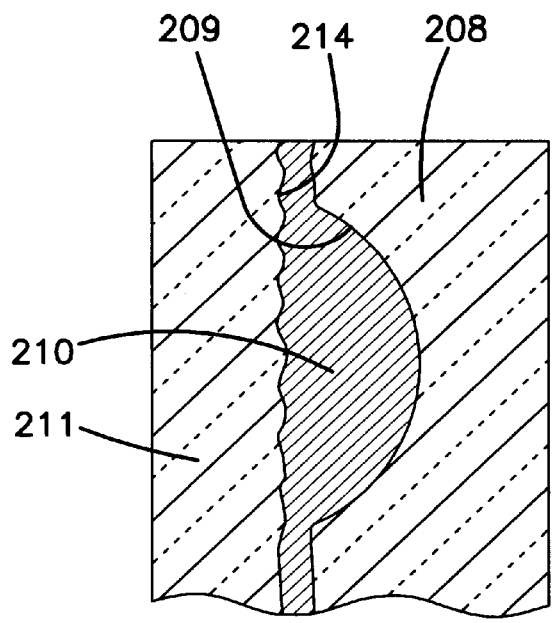
FIG. 9 is an enlarged fragmentary cross-sectional view of the transmissive image display device shown in FIG. 8.

Since the fire-finished (smooth) surfaces of the glass substrates 208, 211 are etched to form the recesses 209, 212, the recesses 209, 212 are shaped exactly complementarily to the mask openings. However, the surfaces of the glass substrates 208, 211 which are not etched are ground and hence suffer minute flaws (surface irregularities) 214 as shown in FIG. 9. When each of the recesses 209 is filled with the synthetic resin having a high refractive index, the synthetic resin also fills up those minute flaws, making them invisible to the extent that is permissible in the user of liquid crystal projectors. Therefore, the surfaces of the glass substrates 208, 211 which are not etched may be ground to an inexpensive grinding level that is much lower than the surface finish level of the other surfaces which are etched.

Specific dimensions of examples of the transmissive liquid crystal display device according to the second embodiment will be described below.

Example 1
  LCD pixel pitch: 30×90 μm (90×90 μm for three pixels of R, G, B);
  Number of LCD pixels: 2400×600 (arranged in a square matrix);
  Effective LCD area: 72×54 mm;
  Microlens pixel pitch: 90×90 μm (square dense array);
  Glass substrate (208, 211): alkali-free glass, n=1.51;
  Glass substrate (208) thickness: 0.7 mm;
  Glass substrate (211) thickness: 0.66 mm;
  Radius of curvature of the etched recesses: 66 μm (for both the first and second lenses);
  Refractive index of the synthetic resin: n=1.66 (for both the first and second lenses); and Focal length of the microlenses: f=440 (for both the first and second lenses).

Example 2
  LCD pixel pitch: 20×60 μm (60×60 μm for three pixels of R, G, B);
  Number of LCD pixels: 2400×600 (arranged in a square matrix);
  Effective LCD area: 48×36 mm;
  Microlens pixel pitch: 60×60 μm (square dense array);
  Glass substrate (208, 211): alkali-free glass, n=1.51;
  Glass substrate (208) thickness: 0.7 mm;
  Glass substrate (211) thickness: 0.44 mm;
  Radius of curvature of the etched recesses: 44 μm (for both the first and second lenses);
  Refractive index of the synthetic resin: n=1.66 (for both the first and second lenses); and
  Focal length of the microlenses: f=296 (for both the first and second lenses).

With the second embodiment, as described above, the light-transmissive panel to which the illuminating light is applied has the first and second planar microlens arrays that are laminated to each other, and the first planar microlens array which is positioned remotely from the liquid crystal layer serves to converge illuminating light onto the pixels and the second planar microlens array which is positioned closer to the liquid crystal layer serves to direct the principal arrays of light substantially parallel to the optical axis thereof. Therefore, it is possible to effectively utilize the illuminating light and reduce the diameter of the projection lens. It is also possible to adjust the substrate thickness between the first and second microlens arrays easily to a value for better mass-production. As a result, a low-cost double-layer microlens array structure can be achieved.

Figure 10:
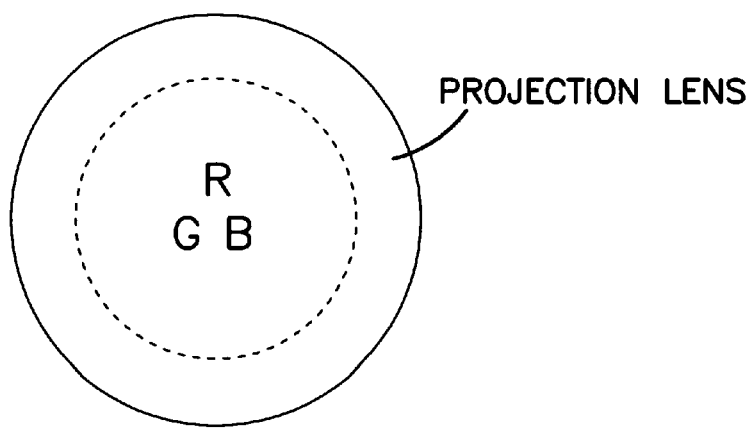
FIG. 10 is a view showing the manner in which light rays of R, G, B converge at one point on a projection lens.
Figure 11:
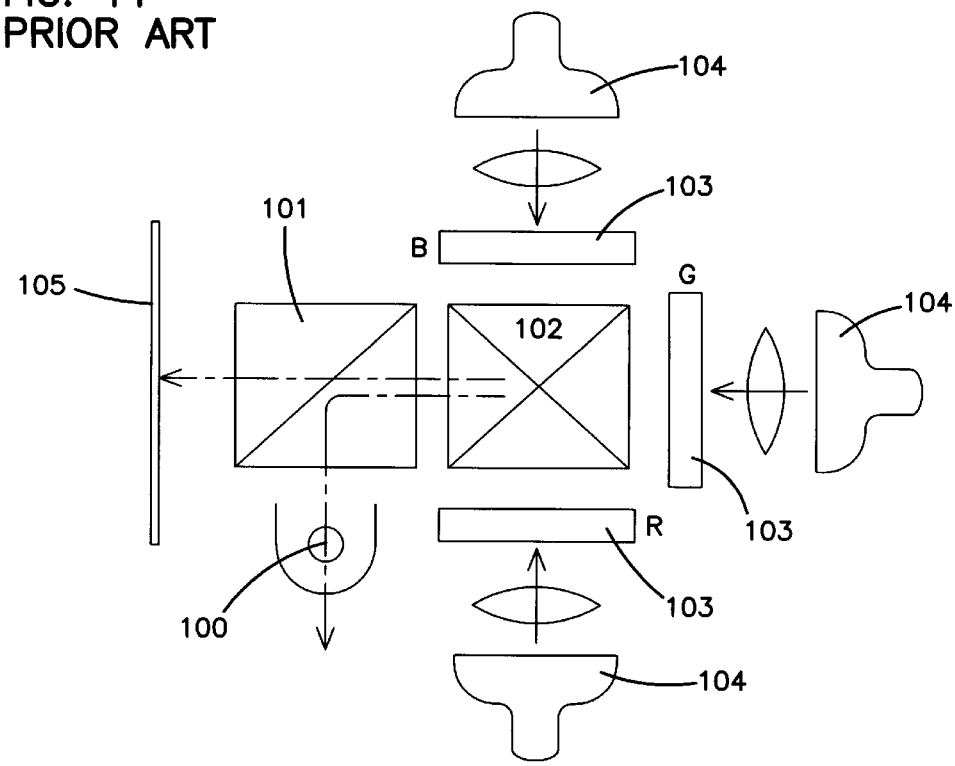
FIG. 11 is a view of a color projector incorporating a conventional reflective liquid crystal display device.
Figure 12:
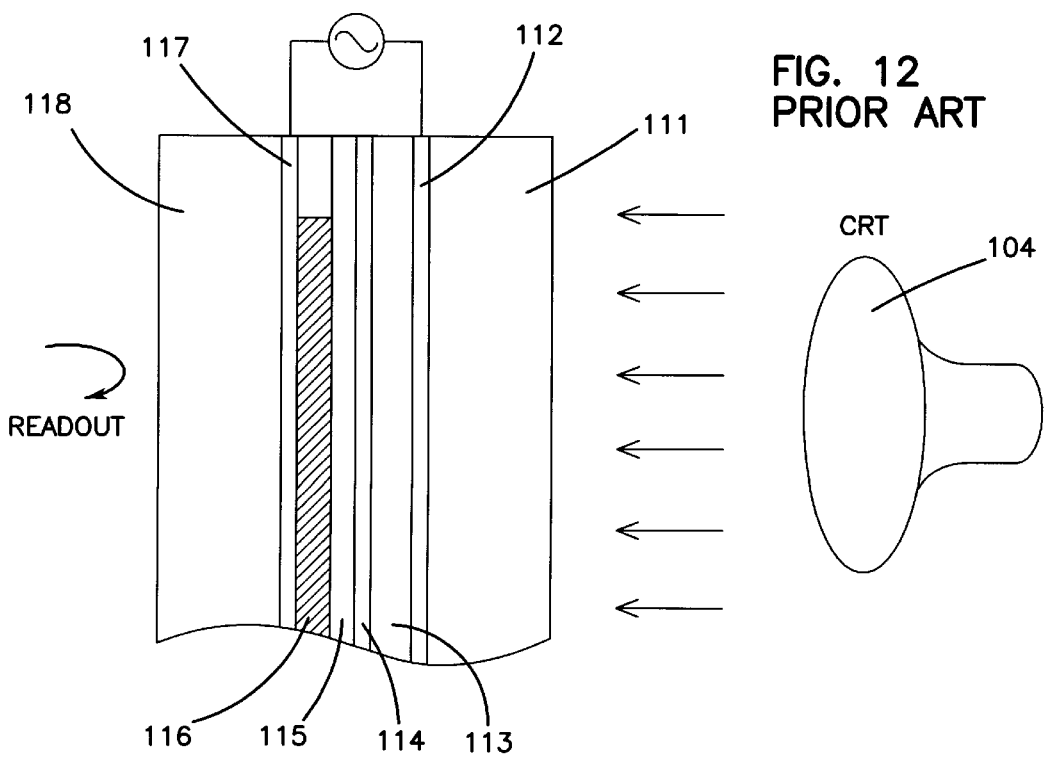
FIG. 12 is a cross-sectional view of the conventional reflective liquid crystal display device.
Figure 13:
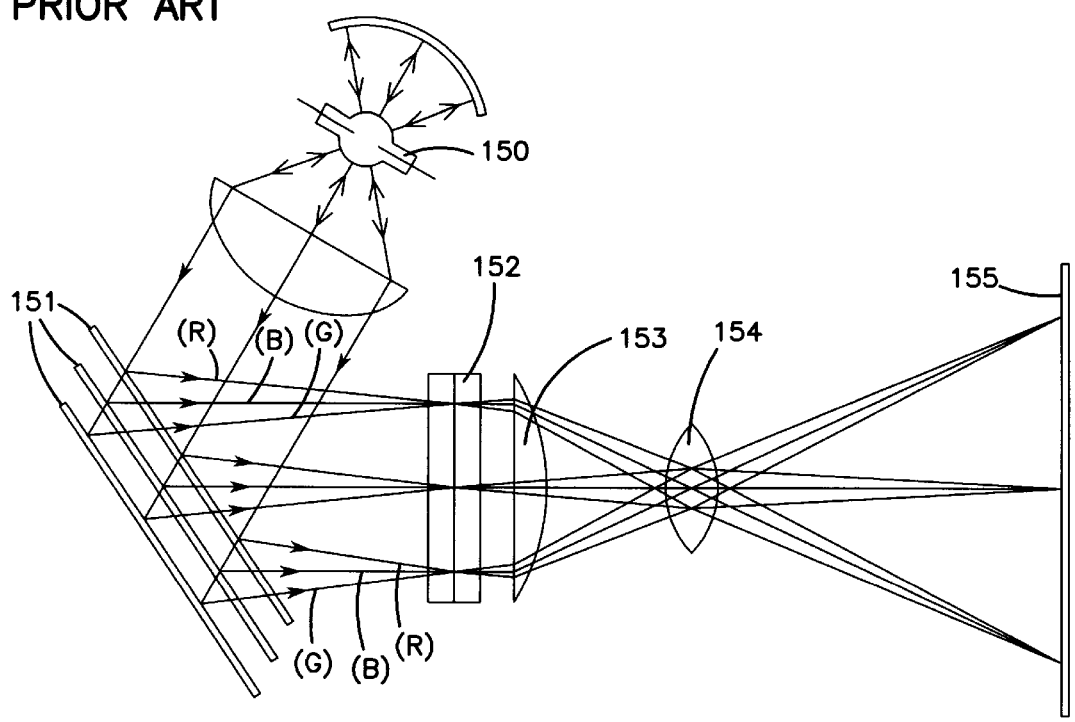
FIG. 13 is a view of a color projector using only one transmissive liquid crystal display device.
Figure 14:
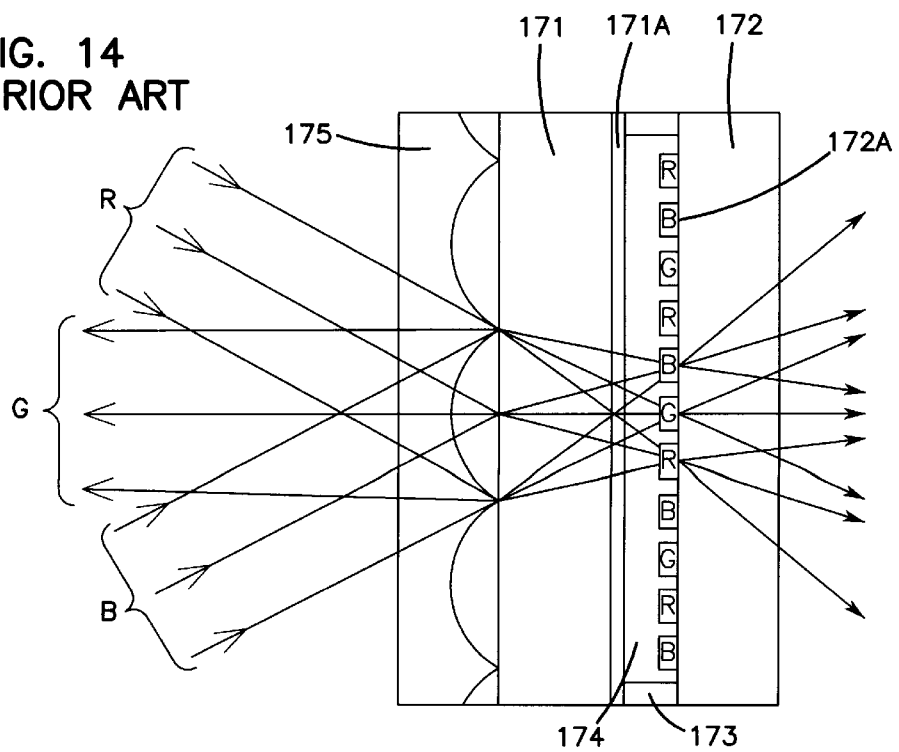
FIG. 14 is a cross-sectional view of the transmissive liquid crystal display device in the color projector shown in FIG. 13.
Figure 15:
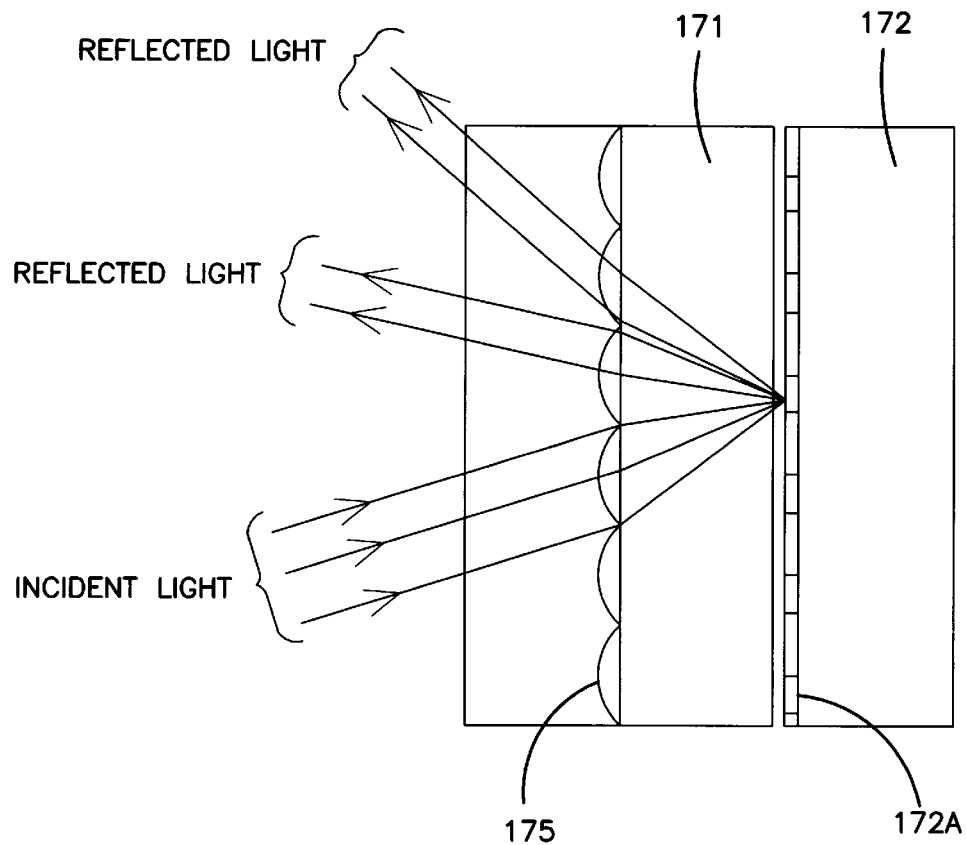
FIG. 15 a view showing how illuminating light is reflected by a reflective image display device which incorporates the transmissive liquid crystal display device shown in FIG. 14.
Figure 16:
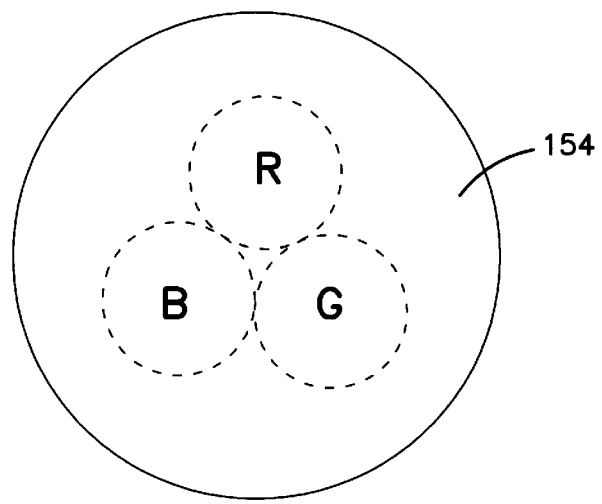
FIG. 16 is a view showing the manner in which light rays of R, G, B spread on a projection lens.
Figure 17:
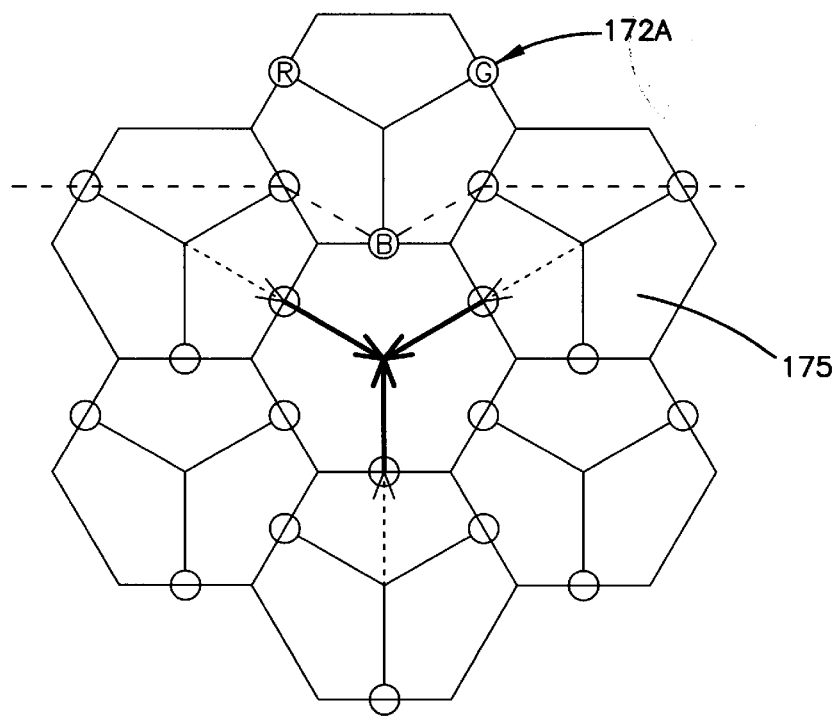
FIG. 17 is a view of lenses and pixels which are arrayed to improve the reflection of the illuminating light shown in FIG. 15.
Figure 18:
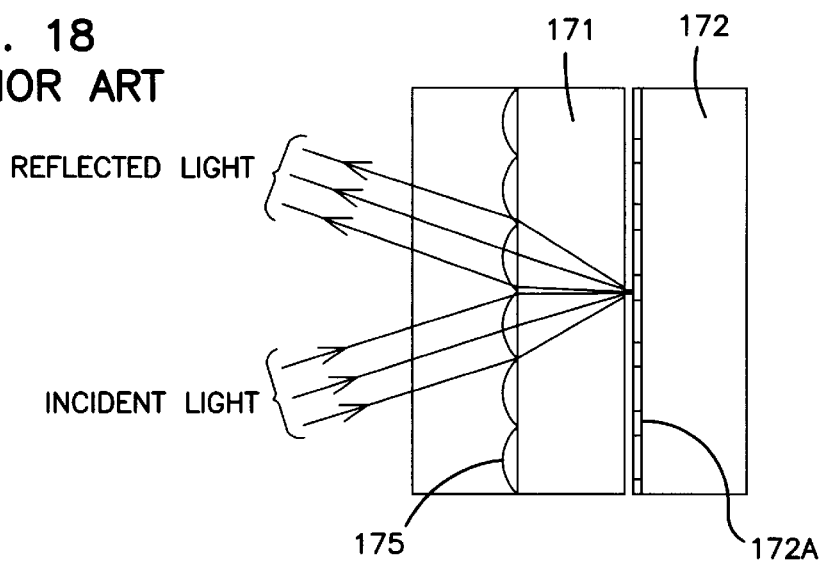
FIG. 18 is a view of paths of illuminating light and reflected light with respect to the array shown in FIG. 17.
Figure 22:
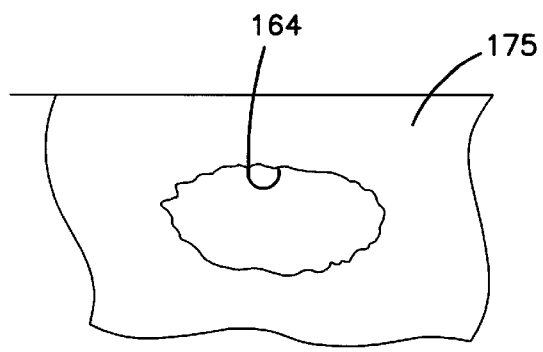
FIG. 22 is an enlarged fragmentary view illustrative of a problem which may arise when the lens arrays are formed op the respective opposite surfaces of the glass substrate.
Figure 19:
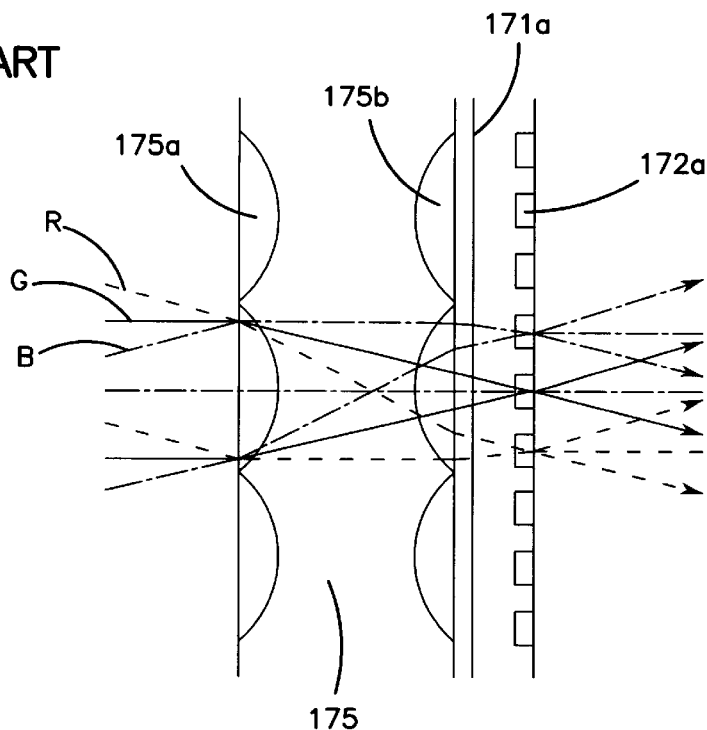
FIG. 19 is a cross-sectional view of a conventional liquid crystal display device incorporating a planar microlens array with two lens arrays disposed on respective opposite surfaces of a glass substrate.
Figure 20:
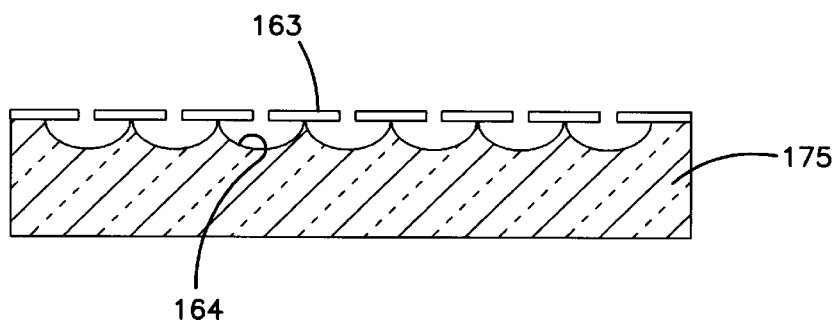
FIG. 20 is a cross-sectional view illustrative of a process of fabricating lens arrays on respective opposite surfaces of a glass substrate.
Figure 21:
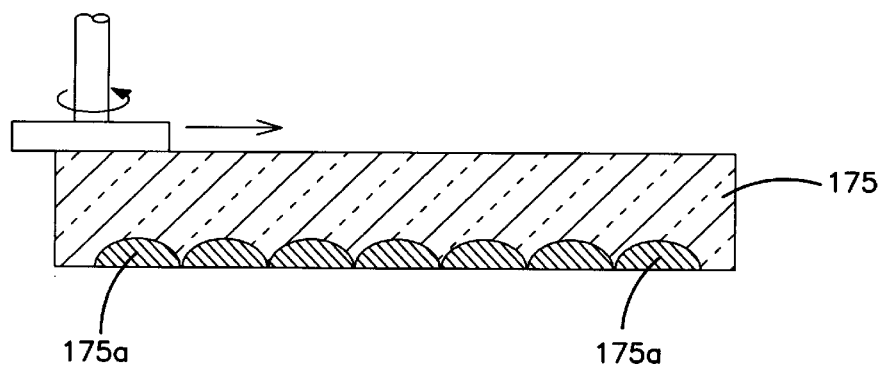
FIG. 21 is a cross-sectional view illustrative of the manner in which the glass substrate is ground to a desired thickness in the process illustrated in FIG. 20.

A transmissive liquid crystal display device for use in a single-panel color projector, where light rays of three primaries are applied at different angles, requires that the illuminating light be applied at an angle to the optical axis, and hence necessarily results in a large angle through which light leaving the transmissive liquid crystal display device spreads. However, as shown in FIG. 10, the transmissive liquid crystal display device according to the second embodiment causes light rays of R, G, B to converge at one point (shown as being separate points in FIG. 10 for illustrative purpose), and can reduce the diameter of the projection lens and is highly effective in projector use.

In the second embodiment, the fire-finished surfaces of the glass substrates are etched to form recesses and the recesses are filled with a synthetic resin having a high refractive index, forming the lenses. Furthermore, the surface of the first planar microlens array which has the lenses and the surface of the second planar microlens array which has been ground are joined to each other. These features are also applicable to the reflective image display device according 10 to the first embodiment of the present invention.

Figure 23:
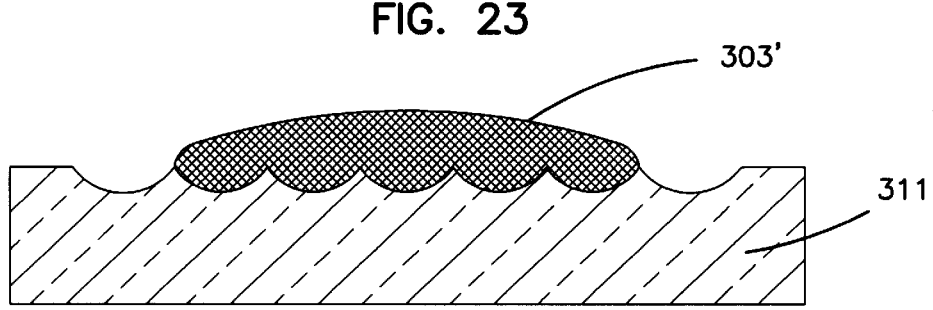
FIGS. 23–25 are cross-sectional views of steps of a method of manufacture resulting in an alternative light transmissive panel to the light transmissive panel in FIGS. 1 and 6.
Figure 24:
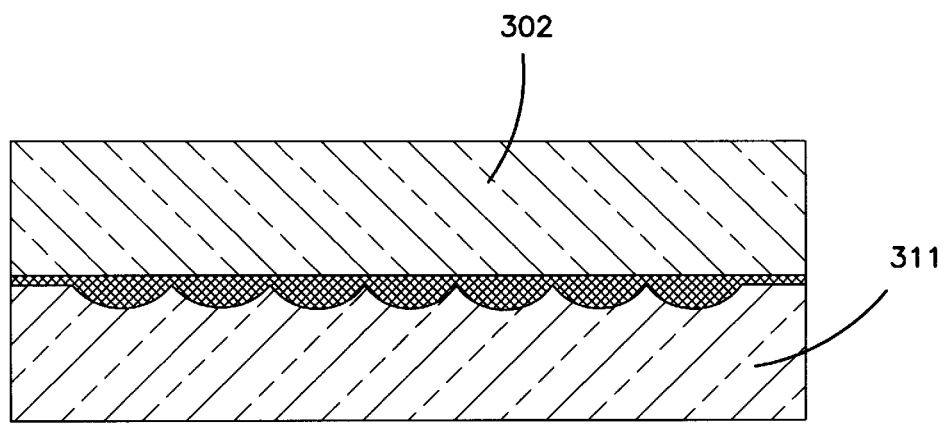
Figure 25:
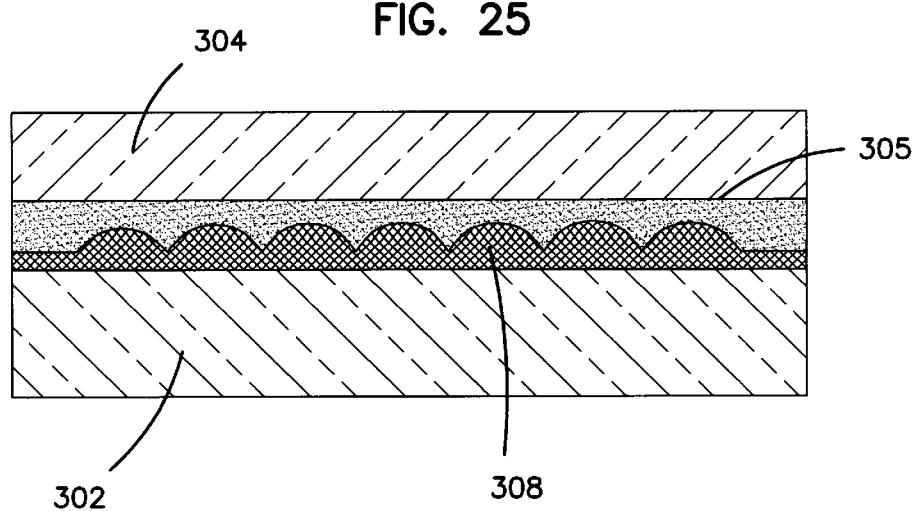

In a functional equivalent to the first and second embodiments, recesses are not defined in the fire-finished surface of the glass substrate. Rather, a material 303' of synthetic resin is applied over a concaved surface of a stamper 311 as shown in FIG. 23, and then the microlens array is created by molding the resin layer under pressure due to a glass substrate 302 H pressurizing the stamper 311 to form symmetrically opposite to the situation illustrated in FIGS. 1, 5 and 6 (or as shown in FIG. 24, so as to protrude each microlens convexly away from the surface of the glass substrate 302). Conversely, the synthetic resin can be firstly applied to the glass substrate 302 and then stamper 311 placed thereon to pressurize and form the microlens array. In any case, a sheet of cover-glass 304 is then applied on the convex surface of the glass 20 substrate 302 through a layer 305 of synthetic resin of a low refractive index (1.45 to 1.53) therebetween. The resultant microlens array (or a pair thereof) includes a plurality of microlenses convexly away from the glass substrate as oppositely to those of FIGS. 1, 5 and 6 but functionally equivalent.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An image display device for controlling reflectivity with respect to illuminating light applied to pixels depending on an image to be displayed, comprising:

reflecting means for reflecting illuminating light toward a readout side thereof; and a light-transmissive panel positioned on said readout side of said reflecting means, said light-transmissive panel comprising a first planar microlens array having lenses for converging the illuminating light and a second planar microlens array having lenses for refracting the illuminating light, which has passed through said first planar microlens array, so as to be applied substantially perpendicularly to said reflecting means, at least one of said first microlens array and said second microlens array further comprising a glass substrate wherein the lenses of said at least one of said first microlens array and said second microlens array are formed of a synthetic resin having high refractive index in a range of 1.58 to 1.63 to be convex lenses which project convexly away from said glass substrate, said convex lenses being covered by a cover glass with a layer of a synthetic resin of low refractive index in a range of 1.45 to 1.53 being formed between said convex lenses and said cover glass.

2. An image display device for controlling transmissivity with respect to illuminating light applied to pixels depending on an image to be displayed, comprising:

transmitting means for transmitting illuminating light from an illuminating side toward a readout side thereof;

a light-transmissive panel positioned on said illuminating side of said transmitting means, said light-transmissive panel comprising a first planar microlens array having lenses for converging the illuminating light and a second planar microlens array having lenses for refracting the illuminating light, which has passed through said first planar microlens array, so as to be applied substantially perpendicularly to said transmitting means, at least one of said first microlens array and said second microlens array further comprising a glass substrate wherein the lenses of said at least one of said first microlens array and said second microlens array are formed of a synthetic resin having high refractive index in a range of 1.58 to 1.63 to be convex lenses which project convexly away from said glass substrate, said convex lenses being covered by a cover glass with a layer of a synthetic resin of low refractive index in a range of 1.45 to 1.53 being formed between said convex lenses and said cover glass.

\* \* \* \* \*